(12) United States Patent
García De La Torre et al.

(10) Patent No.: US 10,087,663 B2
(45) Date of Patent: Oct. 2, 2018

(54) MONITORING SYSTEM FOR MONITORING A TWO-PART-COWL LOCK UNIT

(71) Applicant: EADS CONTRUCCIONES AERONAUTICAS, S.A., SOCIEDAD UNIPERSONAL, Madrid (ES)

(72) Inventors: Mariano Fernando García De La Torre, Madrid (ES); Carlos Manuel Escribano Serrano, Madrid (ES); Isabel Romero Molina, Madrid (ES); Jesús De Gracia Maqueda, Madrid (ES)

(73) Assignee: EADS CONSTRUCCIONES AERONAUTICAS, S.A., SOCIEDAD UNIPERSONAL, Madrid (ES)

( * ) Notice: Subject to any disclaimer, the term of this patent is extended or adjusted under 35 U.S.C. 154(b) by 415 days.

(21) Appl. No.: 14/337,895

(22) Filed: Jul. 22, 2014

(65) Prior Publication Data

US 2015/0021928 A1 Jan. 22, 2015

(30) Foreign Application Priority Data

Jul. 22, 2013 (EP) .................................... 13382294

(51) Int. Cl.

| | | |
|---|---|---|
| *E05B 15/02* | (2006.01) | |
| *E05B 81/72* | (2014.01) | |
| *E05C 1/08* | (2006.01) | |
| *B64D 29/06* | (2006.01) | |
| *E05B 41/00* | (2006.01) | |
| *E05B 15/00* | (2006.01) | |
| *E05B 81/64* | (2014.01) | |

(52) U.S. Cl.
CPC .............. *E05B 81/72* (2013.01); *B64D 29/06* (2013.01); *E05B 41/00* (2013.01); *E05C 1/08* (2013.01); *E05B 81/64* (2013.01); *Y10S 292/49* (2013.01); *Y10T 292/096* (2015.04)

(58) Field of Classification Search
CPC ........ Y10S 292/49; E05B 41/00; E05B 81/64; E05B 81/72; B64D 29/06
USPC .............. 292/38, 50, 163, 177, 179, 256.69, 292/341.15, 341.16, 341.17, 340
See application file for complete search history.

(56) References Cited

U.S. PATENT DOCUMENTS

| | | | | |
|---|---|---|---|---|
| 426,765 | A * | 4/1890 | Brunhoff ................. | E05B 85/22 292/166 |
| 472,886 | A * | 4/1892 | Johnson .................. | E05B 85/28 292/140 |
| 2,202,916 | A * | 6/1940 | Mussa ....................... | E05C 7/06 292/177 |

(Continued)

FOREIGN PATENT DOCUMENTS

| | | |
|---|---|---|
| FR | 2 928 681 | 9/2009 |
| GB | 2 170 548 | 8/1986 |
| WO | WO 2013/026975 | 2/2013 |

*Primary Examiner* — Carlos Lugo
(74) *Attorney, Agent, or Firm* — Jenkins, Wilson, Taylor & Hunt, P.A.

(57) ABSTRACT

A system for monitoring the state of a two-part-cowl lock unit, the lock unit comprising a pair hook-keeper, has a rod mechanically connected to the lock unit, a spring mechanically coupled with the rod, and a warning mechanism configured to be activated by the rod, to warn of the state of the two-part-cowl lock unit. An aircraft may also be configured to include at least one of the systems for monitoring the state of a two-part cowl lock.

10 Claims, 5 Drawing Sheets

(56) References Cited

U.S. PATENT DOCUMENTS

| | | | | |
|---|---|---|---|---|
| 2,653,070 A * | 9/1953 | McClellan | ............ | E05B 65/462 |
| | | | | 109/59 R |
| 3,576,119 A * | 4/1971 | Harris | ................. | E05B 47/0002 |
| | | | | 292/144 |
| 4,389,930 A * | 6/1983 | Rutschilling | ........... | A01F 15/07 |
| | | | | 100/88 |
| 4,557,441 A | 12/1985 | Aspinall | | |
| 4,613,099 A | 9/1986 | Smith et al. | | |
| 4,765,662 A * | 8/1988 | Suska | ................... | E05B 63/248 |
| | | | | 292/219 |
| 4,945,784 A * | 8/1990 | Gergoe | ..................... | F16C 1/12 |
| | | | | 292/DIG. 25 |
| 5,518,206 A | 5/1996 | Arnold et al. | | |
| 5,823,026 A * | 10/1998 | Finke | .................. | E05B 47/0002 |
| | | | | 292/144 |
| 6,017,067 A * | 1/2000 | Yoneyama | .............. | E05B 83/16 |
| | | | | 292/216 |
| 6,454,210 B1 * | 9/2002 | Plattner | ................. | B64C 1/1415 |
| | | | | 244/129.5 |
| 6,622,964 B2 * | 9/2003 | Rouyer | ................... | F02K 1/766 |
| | | | | 239/265.19 |
| 7,048,312 B2 * | 5/2006 | Brunner | ................ | E05B 63/246 |
| | | | | 292/137 |
| 7,131,672 B2 * | 11/2006 | Pratt | ...................... | B64D 29/06 |
| | | | | 292/113 |
| 7,204,458 B2 * | 4/2007 | Porte | ...................... | B64D 29/06 |
| | | | | 244/129.4 |
| 7,552,954 B2 * | 6/2009 | Rozo | ......................... | E05B 5/00 |
| | | | | 292/143 |
| 7,780,208 B2 * | 8/2010 | Koppenhoehl | ......... | B60R 21/38 |
| | | | | 292/121 |
| 7,823,933 B2 * | 11/2010 | Layos | ..................... | E05B 53/00 |
| | | | | 292/336.3 |
| 8,267,464 B2 * | 9/2012 | Konchan | ............... | B60J 5/0479 |
| | | | | 292/150 |
| 8,882,033 B2 * | 11/2014 | Rittner | ..................... | A62B 7/14 |
| | | | | 128/202.26 |
| 2013/0234447 A1 * | 9/2013 | Gonidec | ................. | B64D 29/06 |
| | | | | 292/129 |
| 2014/0030079 A1 * | 1/2014 | Provost | ................. | B64D 29/06 |
| | | | | 415/201 |

* cited by examiner

MONITORING SYSTEM FOR MONITORING A TWO-PART-COWL LOCK UNIT

CROSS-REFERENCE TO RELATED APPLICATION

This application claims priority to European Patent Application No. 13382294.0 filed on Jul. 22, 2013, the entire content of which is incorporated by reference herein.

TECHNICAL FIELD

The subject matter disclosed herein relates to the field of aircraft structures and, more particularly, to the field of elements monitoring the correct lock unit of a cowl comprised in an aircraft.

BACKGROUND

In ordinary maintenance of an aircraft, there are some operations whose failure could pose some problems when operating said aircraft. One is the closure of the cowls that cover each of the engines of the aircraft.

Document U.S. Pat. No. 4,613,099 shows a device mounted inside an engine cowling structure and providing a signal indicating when an internal latch is left inadvertently unlatched when the cowlings are closed. Further, the signal prevents adjacent cowlings from closing until the internal latch is properly secured.

Document U.S. Pat. No. 5,518,206 shows a visual warning based on the projection of an element which is released when the closure parts move to a predetermined open position. The warning is not however easily seen, as it must be placed in the joint line of both fan cowls.

Document GB 2 170 548 A discloses a safety lock of a latch element with an indicator system that closure has occurred correctly. Correct or incorrect position of the latch causes the indicator to move in a guide, so that when the closure has occurred properly, the latch moves to the indicator from a position corresponding to a circle of small diameter at a position corresponding to a circle of greater diameter.

These references provide different ways of warning the incorrect locking of a latch-hook system. However, if the engine is mounted beneath the aircraft wing, the cowling locking mechanism located beneath the engine in a position which is very close to the ground being therefore awkward to access.

The subject matter disclosed herein discloses an alternative system for secure closure of said cowls, providing a warning system for the case in which said closure has not occurred safely.

SUMMARY

The subject matter disclosed herein provides an alternative solution for the aforementioned problems, by a system for monitoring a two-part-cowl lock unit.

In a first inventive aspect, the subject matter disclosed herein provides a system for monitoring the state of a two-part-cowl lock unit, the lock unit comprising a pair hook-keeper, the system comprising:
 a rod mechanically connected to the lock unit,
 a spring mechanically coupled with the rod in a way that an extended state of the spring corresponds to a first position of the rod, and a compressed state of the spring corresponds to a second position of the rod, and
 a warning mechanism adapted to be activated by the rod, and to warn of the state of the two-part-cowl lock unit.

In a particular embodiment, the rod is mechanically connected to the keeper of the lock unit.

In a particular embodiment, the first position of the rod is that in which the keeper is not engaged with the hook, and the second position of the rod is that in which the keeper is engaged with the hook.

In a particular embodiment, the warning mechanism comprises a proximity sensor and the rod comprises a proximity device recognizable by the proximity sensor.

In a particular embodiment, the warning mechanism comprises a cable mechanically coupled with the rod in a way that one position of the rod corresponds to a rest state of the cable and the other position of the rod corresponds to a pulled state of the cable.

In a particular embodiment, the cable is connected to a flap, the rest state of the cable corresponding to a closed state of the flap and the pulled state of the cable corresponding to an open state of the flap.

In a particular embodiment, the system further comprises a tilting piece with a first portion at one side of the tilting axis and a second portion at the other side of the tilting axis of the tilting piece, wherein the rod is mechanically connected to one portion of the tilting piece and the cable is connected to the other portion of the tilting piece.

In a second inventive aspect, the subject matter disclosed herein provides a system for monitoring the state of a two-part-cowl lock, the lock comprising a plurality of lock units, each lock unit comprising a pair hook-keeper, the system comprising
 one rod for each pair hook-keeper, each rod being mechanically connected to each pair hook-keeper,
 one spring for each pair hook-keeper, each spring mechanically coupled with its rod in a way that an extended state of the spring corresponds to a first position of the rod, and a compressed state of the spring corresponds to a second position of the rod, and
 a warning mechanism adapted to be activated by any of the rods and to warn of the state of two-part-cowl lock units.

In a particular embodiment, the warning mechanism comprises a first warning mechanism comprising a proximity sensor for each lock unit and each rod comprising a target recognizable by the proximity sensor.

In a particular embodiment, the cowl lock comprise one main lock unit and at least one normal lock unit, wherein the warning mechanism comprises a second warning mechanism, the system comprising:
 one tilting piece for each lock unit, and a main tilting piece for the main lock unit,
 one transmitting rod for each lock unit, and one main cable for the main lock unit, each transmitting rod connecting the tilting piece of one lock unit to the tilting piece of the next lock unit,
 a main spring that sets the main tilting piece at a resting position against a stop when no force is exerted to the main tilting piece,
 wherein the main tilting piece comprises at least three portions, the first one being attached to the transmitting rod, the second one being in reach of the rod which is connected to the main lock unit and the third one being connected to the main cable, and
 the main cable connects the main tilting piece of the main lock unit with the main locking adapted to hold and release a flap.

Advantageously, any of these first and second warning mechanisms described in the first and second inventive aspects are suitable for being placed in any part of the aircraft, in particular where they can be easily visible by the person in charge of monitoring the correct locking of the locks.

In a third inventive aspect, the subject matter disclosed herein provides an aircraft comprising a system for monitoring the state of a two-part-cowl lock unit according to the first inventive aspect and/or a system for monitoring the state of a two-part-cowl lock according to the second inventive aspect.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the subject matter disclosed herein will become clearly understood in view of the detailed description of the subject matter disclosed herein which becomes apparent from a preferred embodiment of the subject matter disclosed herein, given just as an example and not being limited thereto, with reference to the drawings.

DETAILED DESCRIPTION

Figure 1A:
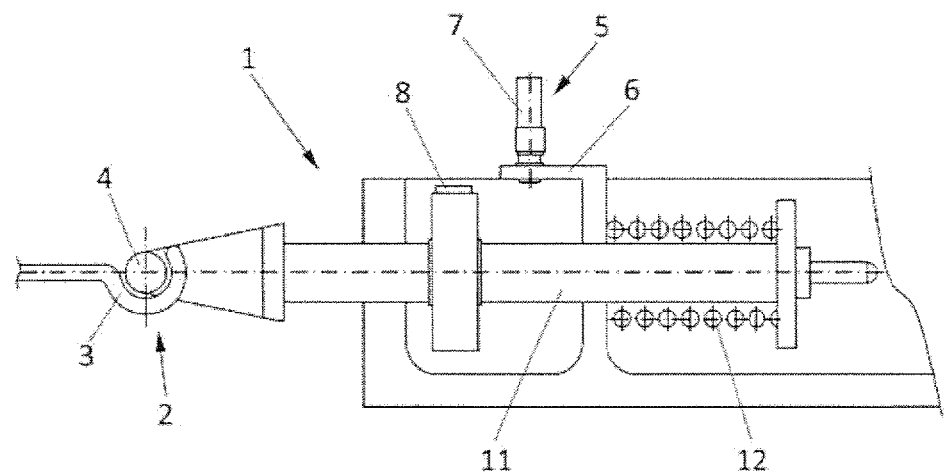
FIGS. 1a and 1b illustrate an embodiment of a monitoring system according to the subject matter disclosed herein, with the first electronic warning mechanism in its two positions.
Figure 1B:
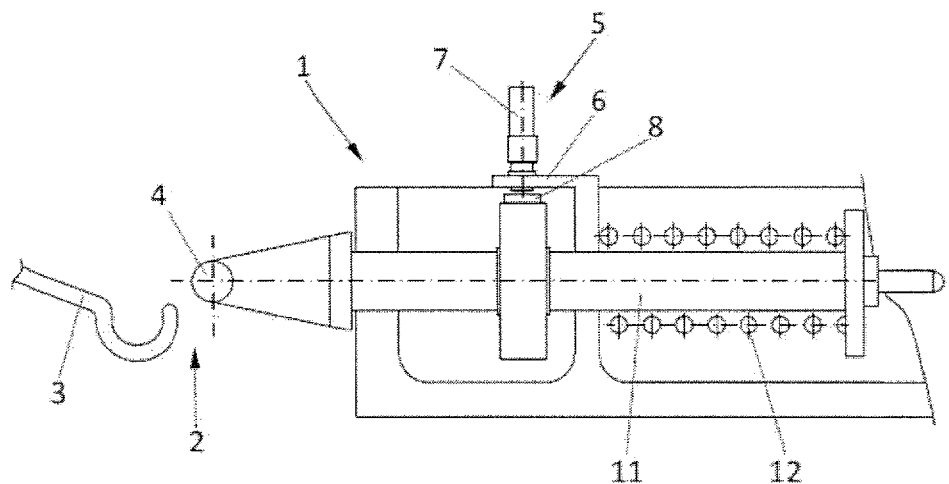

FIGS. 1a and 1b shows a particular monitoring system (1) for monitoring a two-part-cowl lock unit (2) according to the subject matter disclosed herein. The system comprises:
a rod (11) which is mechanically connected to the lock unit (2), and
a spring (12) mechanically coupled with the rod (11) in a way that an extended state of the spring (12) corresponds to an first state of the rod (11), and a compressed state of the spring (12) corresponds to an second state of the rod (11).

In the embodiments shown in this description, the first state is an outward state, because the rod (11) is out further from the cowl lock unit (2) and the second state is an inward state, because the rod (11) is nearer the cowl lock unit (2).

In the particular embodiment of these FIGS. 1a and 1b, each lock unit (2) comprises a pair hook (3)-keeper (4), and the rod (11) is mechanically coupled to the keeper (4) of the lock unit (2).

In this embodiment of FIGS. 1a and 1b, the monitoring system (1) comprises a first warning mechanism (5), adapted to be activated by the rod (11) when it moves to an outward position. The first warning mechanism (5) comprises a structure (6) which contains a proximity sensor (7) and a target (8) which can be detectable by the proximity sensor (7) and is arranged on the rod (11).

FIG. 1a shows the monitoring system (1) when the lock unit (2) is closed. The rod (11) is engaged and cannot be moved and the spring (12), which is arranged in connection with the rod (11), tries to expand, but as the rod (11) is engaged, it is not dragged by the spring (12), thus remaining in an inward position. In this case, the proximity sensor (7) is not activated, because the target (8) is far enough to not be detected by the proximity sensor (7).

FIG. 1b shows the system when the lock unit (2) is open. In this case, the rod (11) is loose, and is carried by the spring (12) to an outward position, while the spring (12) extends. The target (8) is thus carried by the rod (11) towards near the proximity sensor (7), thus activating it, so that the first warning mechanism (5) issues an electronic warning of "open lock".

In another embodiment, the target (8) is arranged so that when the rod (11) is in its inward position, the target (8) activates the proximity sensor (7), and when the rod (11) is in its outward position, the target (8) is far enough to be detected by the proximity sensor (7).

Figure 2A:
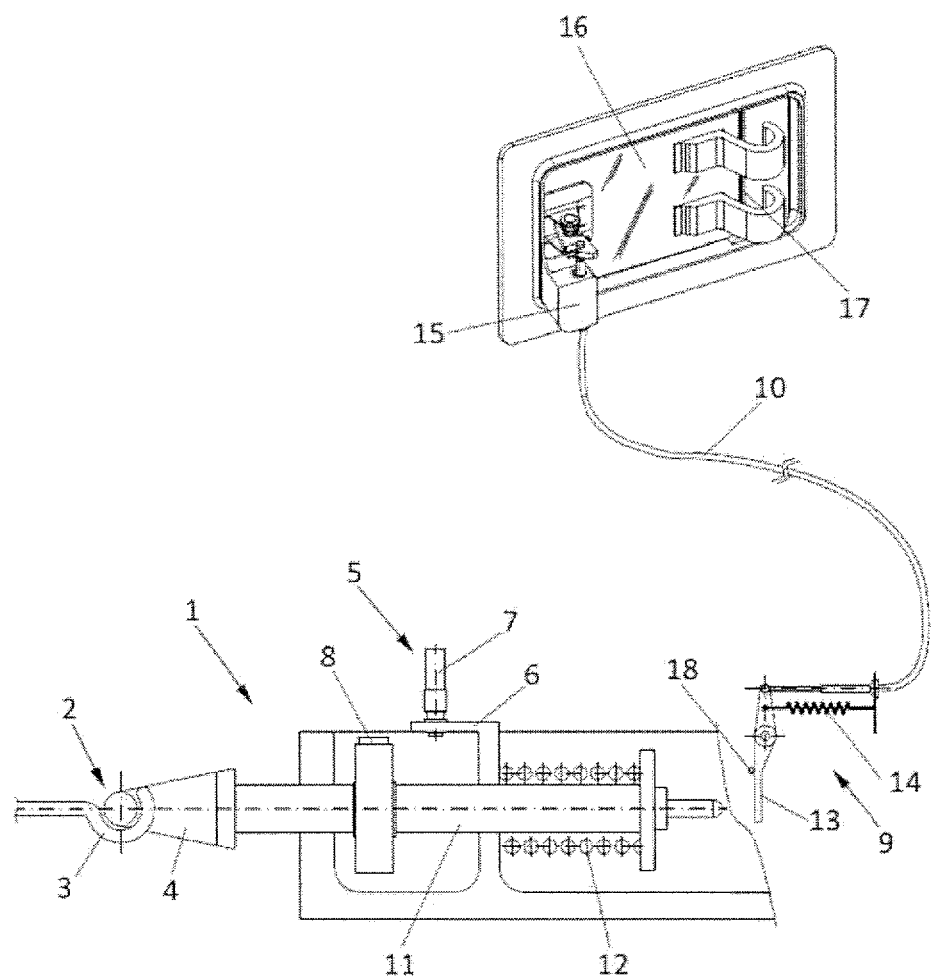
FIGS. 2a and 2b illustrate an embodiment of a monitoring system according to the subject matter disclosed herein, with the second mechanical warning mechanism in its two positions.
Figure 2B:
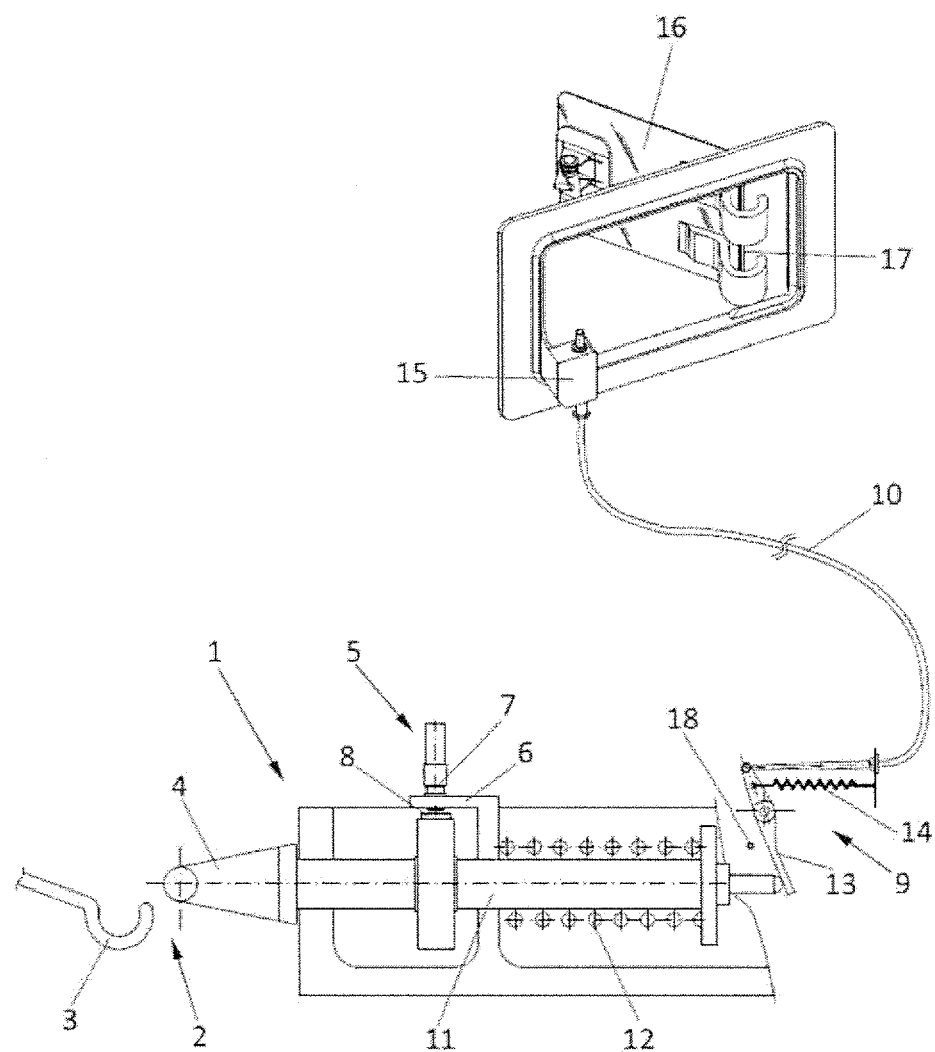

FIGS. 2a and 2b show another particular embodiment of the monitoring system (1) according to the subject matter disclosed herein. The rod (11) is mechanically coupled to the keeper (4) of the lock unit (2), and the spring (12) is arranged as in the embodiment shown in FIGS. 1a and 1b. This embodiment also comprises a first warning mechanism (5). In this particular embodiment, the monitoring system (1) also comprises a second warning mechanism (9). The second warning mechanism (9) comprises a cable (10) mechanically coupled with the rod (11), a tilting piece (13), a secondary spring (14), secondary lock(15), a flap (16) and a torsion spring (17). The cable (10) is coupled with the rod (11) by the tilting piece (13). The tilting piece (13) is a rigid piece with two portions. It is attached to a fixed point so that the movement of one portion is transmitted to the other portion. First portion is at reach of the rod (11), in a way that when the rod (11) is in its outward state, the rod (11) pushes the first portion of the tilting piece (13), and the movement of this portion is transmitted to the second portion, which is in turn attached to the cable (10). This is how the coupling between the rod (11) and the cable (10) is achieved. This tilting piece (13) is provided with the secondary spring (14) that set the tilting piece (13) at a resting position against a stop (18) when no force is exerted to the tilting piece (13).

FIG. 2a shows the monitoring system (1) when the lock unit (2) is closed, causing the rod (11) being in its inward position and the spring (12) being in the compressed position, as explained in FIG. 1a. In this case, the rod (11) does not press the first portion of the tilting piece (13), so the second portion of the tilting piece (13) does not exert any force to the cable (10), the cable remaining at its rest position.

FIG. 2b shows the system when the lock unit (2) is open, and the rod (11) is therefore in its outward position, as explained in FIG. 1b. In this case, the rod (11) pushes the first portion of the tilting piece (13), causing its tilting, so that the second portion of the tilting piece (13) pulls of the cable (10).

In this embodiment, as shown in the FIGS. 2a and 2b, the cable (10) is connected to the secondary lock (15) adapted to hold and release the flap (16).

FIG. 2a shows the cable (10) at its rest position. The cable (10) is inside the secondary lock (15) and this fact causes the secondary lock (15) to be closed, and therefore, the flap (16) is retained.

In FIG. 2b, when the cable (10) is pulled, the cable (10) gets out the secondary lock (15), causing the flap (16) to be released and, after being moved by the torsion spring (17), to stand out, becoming the mechanic warning of "open lock". In a particular embodiment, the torsion spring (17) is a spring loaded hinge.

Advantageously, this system (1) prevents the flap (16) from remaining closed if a third party tries to close it when the lock unit (2) is not properly closed. As the secondary lock (15) is always connected to the cable (10) and the cable (10) remains pulled until the lock unit (2) is properly closed, the secondary lock (15) does not retain the flap (16) in its closed position, the flap (16) being therefore moved by the torsion spring (17) to stand out.

In a particular embodiment, not shown in these figures, the system (1) comprises the second warning mechanism (9), but without the first warning mechanism (5).

Figure 3A:
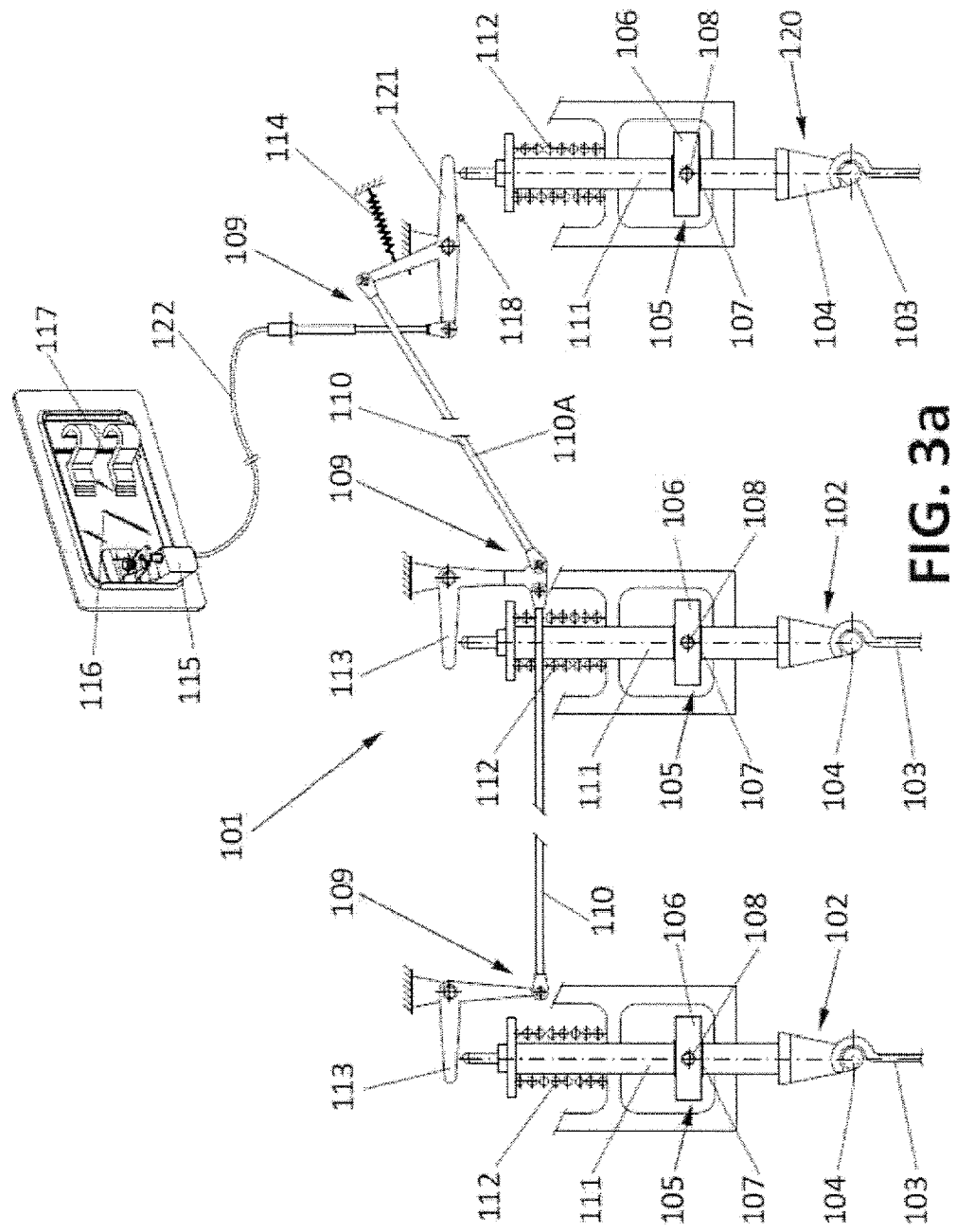
FIGS. 3a and 3b illustrate an embodiment of a complex monitoring system according to the subject matter disclosed herein.
Figure 3B:
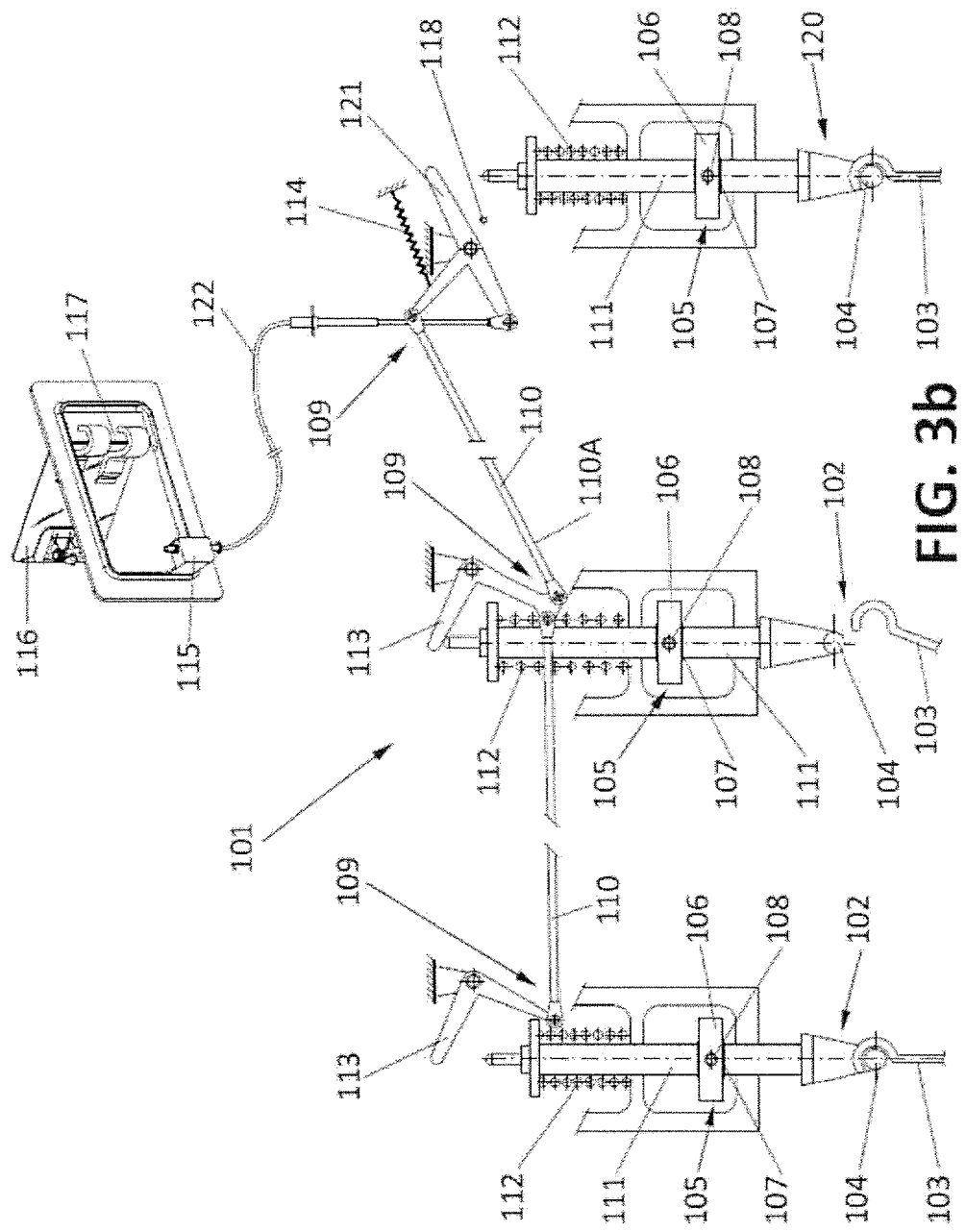

FIGS. 3a and 3b show an embodiment of a complex monitoring system (101) according to the subject matter disclosed herein. This complex monitoring system (101) is suitable for monitoring a cowl lock with several lock units (102, 120), each of one comprising a pair hook (103)-keeper (104). The cowl lock comprises one main lock unit (120) and at least one normal lock unit (102). Advantageously, this complex monitoring system (101) allows the monitoring of a cowl lock that requires that a warning is issued when any of them are not closed correctly. This complex monitoring system (101) comprises:
one rod (111) for each normal lock unit (102), and one rod (111) for the main lock unit (120), each rod (111) being mechanically connected to its lock unit (102, 120), and
one spring (112) for each rod (111), each spring (112) mechanically coupled with its rod (111) in the same way as it was in the embodiment shown in FIGS. 1 and 2.

The complex monitoring system (101) also comprises warning mechanisms (105, 109) adapted to be activated by any of the rods (111).

In a particular embodiment, each rod (111) is mechanically coupled to a keeper (104) of the lock unit (102, 120) so that if a lock unit (102, 120) is closed, its rod (111) is engaged and cannot be moved. A spring (112) is arranged in connection with each rod (111), so that when a spring (112) extends, it tries to drag its rod (111) therewith. If a lock unit (102, 120) is open, its rod (111) is loose, and can be carried by its spring (112) to an outward position. If a lock unit (102, 120) is closed, as its rod (111) is attached thereto, its spring (112) cannot move the rod (111), and the rod (111) remains in an inward position.

In the embodiment shown in FIGS. 3a and 3b, the complex monitoring system (101) comprises first warning mechanism (105), comprising a structure (106) which contains one proximity sensor (107) for each lock unit and a target (108) which can be detectable by the proximity sensor (107), arranged on each rod (111), so that when a rod (111) is in its inward position, it activates its proximity sensor (107), and the first warning mechanism (105) interprets that this lock unit (102, 120) is closed. When a rod (111) is in its outward position, the target (108) is far to activate its proximity sensor (107), and the first warning mechanism (105) issue an electronic warning of "open lock". In another embodiment, the target (108) is arranged so that when the rod (111) is in its outward position, the target (108) activates the proximity sensor (107), and when the rod (111) is in its inward position, the target (108) is far enough to be detected by the proximity sensor (107). First warning mechanism (105) is suitable for being programmed to interpret both situations. In a particular embodiment, the first warning mechanism (105) is programmable, so that the user is able to choose if the warning is issued when any of the lock units (102, 120) are not properly closed, or if a determined lock unit (102, 120) is not properly closed or if at least a number of them are not properly closed.

In this embodiment shown in FIGS. 3a and 3b, the complex monitoring system (101) comprises also a second coupled warning mechanism (109). The operation of the second coupled warning mechanism (109) is based on the operation of second warning mechanism (9) used in the first embodiment with a single lock unit (2).

As in the case of the first embodiment with a single lock unit (2), the second coupled warning mechanism (109) uses one rod (111) mechanically coupled to each keeper (104) of each lock unit (102, 120) comprised in the lock, these rods (111) being the same as the ones which are used in the first warning mechanism (105).

The second coupled warning mechanism (109) also comprises one tilting piece (113) for each normal lock unit (102), and a main tilting piece (121) for the main lock unit (120).

The second coupled warning mechanism (109) comprises one transmitting rod (110) for each normal lock unit (102), and one main cable (122) for the main lock unit (120). Each transmitting rod (110) connect the tilting piece (113) of one lock unit to the tilting piece (113) of the next lock unit. Among them, there is one main transmitting rod (110A) that connects the tilting piece (113) of the normal lock unit (102) which is next to the main lock unit (120) to the main tilting piece (121) of the main lock unit (120). This main tilting piece (121) is provided with a main spring (114) that set the main tilting piece (121) at a resting position against a stop (118) when no force is exerted to the main tilting piece (121). The main cable (122) connects the main tilting piece (121) of the main lock unit (120) with the main lock (115), which is adapted to hold and release a flap (116).

The main tilting piece (121) therefore comprises at least three portions. First portion is attached to the main transmitting rod (110A), that is also connected to the normal lock unit (102) which is next to the main lock unit (120). Second portion is in reach of the rod (111) which is connected to the main lock unit (120) and third portion is connected to the main cable (122). In this way, when neither the main transmitting rod (110A) nor the rod (111) of the main lock unit (120) acts over the main tilting piece (121), it remains at its rest position because of the main spring (114) that set the main tilting piece (121) against the stop (118). When either the main transmitting rod (110A) or the rod (111) of the main lock unit (120) acts over the main tilting piece (121), the main tilting piece (121) transmits the movement to the main cable (122), pulling it.

As in the first embodiment with a single lock unit (2), if nothing acts over the main cable (122), it is inside the main lock (115), and this fact causes the main lock (115) to be closed, and therefore, the flap (116) is retained.

FIG. 3a shows a complex monitoring system (101) according to the subject matter disclosed herein when all the lock units (102, 120) are closed and, because of that, all the rods (111) are in its inward position, and the springs (112) are compressed, so no first warning mechanism (105) is activated. As the rods (111) are in its inward position and the springs (112) are thus in the compressed position, no rod (111) presses any tilting piece (113), no tilting piece (113) does exert any force to any transmitting rod (110), and as the rod (111) of the main lock unit (120) does not acts over the main tilting piece (121) either, the main cable (122) remaining at its rest position.

FIG. 3b shows the same monitoring system (101) of FIG. 3a, but when one of the lock units (102, 120) is open. This open lock unit can be either a normal lock unit (102) or the main lock unit (120). In the embodiment of this figure, it is the central lock unit which is open. When one lock unit (102) is open, its rod (111) is loose, so its spring (112) extends and drags the rod (111) with it, causing its target (108) to be far from the proximity sensor (107), causing the first warning mechanism (105) to activate. As the rod (111) is therefore in its outward position, it pushes one portion of the tilting piece (113), causing its tilting, so that the other portion of the tilting piece (113) pulls the transmitting rod (110) of the open lock unit, which in this case coincides with the main transmitting rod (110A). The movement is transmitted from transmitting rod to transmitting rod until reaching the main transmitting rod (110A), which pulls the main tilting piece (121). The main tilting piece (121) pulls the main cable (122). The main cable (122) gets out the main lock (115), causing the flap (116) to be released and, after being moved by a torsion spring (117), to stand out, becoming the mechanic warning of "open lock".

Advantageously, as in the embodiment shown in FIGS. 2*a* and 2*b*, this monitoring system (101) prevents the flap (116) from remaining closed if a third party tries to close it when the lock unit (102, 120) is not properly closed. As the main lock (115) is always connected to the main cable (122) and the main cable (122) remains pulled until the lock unit (102, 120) is properly closed, the main lock (115) does not retain the flap (116) in its closed position, the flap (116) being therefore moved by the torsion spring (117) to stand out.

The invention claimed is:

1. A system for monitoring a state of a two-part-cowl lock, the lock comprising a plurality of lock units, the plurality of lock units comprising a main lock unit and one or more normal lock units, and the system comprising:
    a rod for each of the plurality of lock units, the rod of each of the plurality of lock units being mechanically connected to a corresponding pair hook-keeper, each of which have a hook and a keeper, of a respective one of the plurality of lock units;
    a spring for each of the plurality of lock units, the spring of each of the plurality of lock units being mechanically coupled to the rod of a respective one of the plurality of lock units so that an extended state of the spring corresponds to a first position of the rod of the respective one of the plurality of lock units, and a compressed state of the spring corresponds to a second position of the rod of the respective one of the plurality of lock units; and
    a warning mechanism configured to be operated by any of the rods to warn of the state of the two-part-cowl lock, the warning mechanism comprising:
        a tilting piece for each of the one or more normal lock units;
        a main tilting piece for the main lock unit;
        a transmitting rod for each of the one or more normal lock units, each transmitting rod connecting the tilting piece of a respective one of the one or more normal lock units to a tilting piece of a next one of the one or more normal lock units or to the main tilting piece;
        a main cable configured to connect the main tilting piece with a main lock configured to hold and release a flap; and
        a main spring configured to set the main tilting piece at a resting position against a stop when no force is exerted on the main tilting piece,
    wherein the main tilting piece comprises at least first, second, and third portions, the first portion being attached to the transmitting rod of one of the one or more normal lock units, the second portion being configured to mechanically interface with the rod of the main lock unit, and the third portion being fixedly connected to the main cable, and
    wherein the main cable is movably linked to the rod of each of the plurality of lock units so that, when each rod is in the second position, the main cable is in a rest state and all rods of the plurality of lock units are positioned so as to not exert an actuating force on the tilting pieces or the main tilting piece to indicate the lock is in a locked state, and, when one or more rod is in the first position, the main cable is in a pulled state due to contact the one or more rod with one of the tilting pieces and/or the main tilting piece, so that each tilting piece and the main tilting piece are each in an actuated position to indicate the lock is in an unlocked state,
    wherein the system is configured such that, when the main tilting piece moves from the actuated position to the resting position, the main cable automatically moves from the pulled state to the rest state.

2. The system according to claim 1, wherein:
    when the rod of one or more of the plurality of lock units is in the first position, the keeper of each of the one or more of the plurality of lock units is not positioned to engage with the hook; and
    when the rod of one or more of the plurality of lock units is in the second position, the keeper of each of the one or more of the plurality of lock units is positioned to engage with the hook.

3. The system of claim 1, comprising an additional warning mechanism for each of the plurality of lock units, wherein each additional warning mechanism comprises a proximity sensor and a target configured for detection by the proximity sensor, wherein the target is attached to the rod of a corresponding one of the plurality of lock units to indicate the state of the one or more of the plurality of lock units.

4. The system of claim 1, wherein the rest state of the main cable corresponds to a closed state of the flap and the pulled state of the main cable corresponds to an open state of the flap.

5. The system of claim 1, comprising an additional warning mechanism for one or more of the plurality of lock units, wherein each additional warning mechanism comprises a proximity sensor and a target configured for detection by the proximity sensor, wherein the target is attached to the rod of a corresponding one of the one or more of the plurality of lock units to indicate the state of the one or more of the plurality of lock units.

6. An aircraft comprising at least one system for monitoring a state of a two-part-cowl lock, the lock comprising a plurality of lock units comprising a main lock unit and one or more normal lock units, and the system comprising:
    a rod for each of the plurality of lock units, the rod of each of the plurality of lock units being mechanically connected to a corresponding pair hook-keeper, each of which have a hook and a keeper, of a respective one of the plurality of lock units;
    a spring for each of the plurality of lock units, the spring of each of the plurality of lock units being mechanically coupled to the rod of a respective one of the plurality of lock units so that an extended state of the spring corresponds to a first position of the rod of the respective one of the plurality of lock units, and a compressed state of the spring corresponds to a second position of the rod of the respective one of the plurality of lock units;

a warning mechanism configured to be operated by any of the rods to warn of the state of the two-part-cowl lock, the warning mechanism comprising:
   a tilting piece for each of the one or more normal lock units;
   a main tilting piece for the main lock unit;
   a transmitting rod for each of the one or more normal lock units, each transmitting rod connecting the tilting piece of a respective one of the one or more normal lock units to a tilting piece of a next one of the one or more normal lock units or to the main tilting piece;
   a main cable configured to connect the main tilting piece with a main lock configured to hold and release a flap; and
   a main spring configured to set the main tilting piece at a resting position against a stop when no force is exerted on the main tilting piece,
   wherein the main tilting piece comprises at least first, second, and third portions, the first portion being attached to the transmitting rod of one of the one or more normal lock units, the second portion being configured to mechanically interface with the rod of the main lock unit, and the third portion being fixedly connected to the main cable, and
   wherein the main cable is movably linked to the rod of each of the plurality of lock units so that, when each rod is in the second position, the main cable is in a rest state and all rods of the plurality of lock units are positioned so as to not exert an actuating force on the tilting pieces or the main tilting piece to indicate the lock is in a locked state, and, when one or more rod is in the first position, the main cable is in a pulled state due to contact the one or more rod with one of the tilting pieces and/or the main tilting piece, so that each tilting piece and the main tilting piece are each in an actuated position to indicate the lock is in an unlocked state,
   wherein the system is configured such that, when the main tilting piece moves from the actuated position to the resting position, the main cable automatically moves from the pulled state to the rest state.

7. The system of claim 6, wherein the rest state of the main cable corresponds to a closed state of the flap and the pulled state of the main cable corresponds to an open state of the flap.

8. The aircraft of claim 6, wherein the system comprises an additional warning mechanism for one or more of the plurality of lock units, wherein each additional warning mechanism comprises a proximity sensor and a target configured for detection by the proximity sensor, wherein the target is attached to the rod of a corresponding one of the one or more of the plurality of lock units to indicate the state of the one or more of the plurality of lock units.

9. The aircraft of claim 6, wherein the system comprises an additional warning mechanism for each of the plurality of lock units, wherein each additional warning mechanism comprises a proximity sensor and a target configured for detection by the proximity sensor, wherein the target is attached to the rod of a corresponding one of the plurality of lock units to indicate the state of the one or more of the plurality of lock units.

10. The aircraft according to claim 6, wherein:
   when the rod of one or more of the plurality of lock units is in the first position, the keeper of each of the one or more of the plurality of lock units is not positioned to engage with the hook; and
   when the rod of one or more of the plurality of lock units is in the second position, the keeper of each of the one or more of the plurality of lock units is positioned to engage with the hook.

* * * * *